(12) United States Patent
Lumley et al.

(10) Patent No.: US 8,542,092 B2
(45) Date of Patent: Sep. 24, 2013

(54) KEYLESS-GO IGNITION SWITCH WITH FAULT BACKUP

(75) Inventors: Paul Lumley, Plymouth, MI (US); Mike Blossfeld, South Lyon, MI (US); Luis Fernando Sanchez, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 980 days.

(21) Appl. No.: 12/361,839

(22) Filed: Jan. 29, 2009

(65) Prior Publication Data

US 2010/0188192 A1    Jul. 29, 2010

(51) Int. Cl.
*G05B 19/00* (2006.01)
*G06F 7/04* (2006.01)
*H04B 1/00* (2006.01)

(52) U.S. Cl.
USPC .................. 340/5.62; 340/5.72; 340/10.1

(58) Field of Classification Search
USPC ........... 340/5.62, 5.72, 10.1–10.5; 307/10.2, 307/10.3; 70/285
See application file for complete search history.

(56) References Cited

U.S. PATENT DOCUMENTS

| | | | | |
|---|---|---|---|---|
| 5,461,386 A * | 10/1995 | Knebelkamp | ................ | 342/44 |
| 5,982,295 A * | 11/1999 | Goto et al. | ................ | 340/10.52 |
| 6,034,617 A * | 3/2000 | Luebke et al. | ................ | 340/5.62 |
| 6,087,735 A | 7/2000 | Nakamura | | |
| 6,323,566 B1 * | 11/2001 | Meier | ................ | 307/10.2 |
| 6,351,206 B1 * | 2/2002 | Schweiger et al. | ........ | 340/5.64 |
| 6,538,560 B1 * | 3/2003 | Stobbe et al. | ................ | 340/5.72 |
| 6,717,119 B2 * | 4/2004 | Ondruschka et al. | ........ | 219/679 |
| 6,747,545 B2 * | 6/2004 | Nowottnick et al. | ........ | 340/5.61 |
| 6,776,016 B1 * | 8/2004 | Wittwer et al. | ................ | 70/252 |
| 7,142,090 B2 * | 11/2006 | Ueda et al. | ................ | 340/5.61 |
| 7,187,266 B2 | 3/2007 | Hasegawa et al. | | |
| 7,227,447 B2 * | 6/2007 | Ohtaki et al. | ................ | 340/5.62 |
| 7,290,416 B2 * | 11/2007 | Ohtaki et al. | ................ | 70/252 |

(Continued)

FOREIGN PATENT DOCUMENTS

| | | |
|---|---|---|
| CN | 1537758 | 10/2004 |
| CN | 10104375 A | 9/2007 |

(Continued)

OTHER PUBLICATIONS

The International Search Report dated Aug. 23, 2010 for PCT International Application No. PCT/US2010/021690, filed Jan. 22, 2010.

*Primary Examiner* — Nam V Nguyen
(74) *Attorney, Agent, or Firm* — Tarolli, Sundheim, Covell & Tummino LLP

(57) ABSTRACT

A vehicle ignition system includes a fob for transmitting an identification code. The fob includes a low frequency transceiver circuit and low frequency antenna. An ignition module is provided including, a housing, switch contacts and a push button slidably mounted in the housing and arranged so that pushing of said button closes said switch contacts. A LF coil is provided and is axially stationary within the housing and is located inside of the push button. An ignition module circuit provides power to the fob and establishes low frequency communications with the fob via the LF coil. An immobilizer circuit is operatively coupled to the ignition module for permitting or preventing actuation of the ignition system in response to the low frequency communications with the fob and the ignition module.

4 Claims, 4 Drawing Sheets

(56) References Cited

U.S. PATENT DOCUMENTS

| | | | |
|---|---|---|---|
| 7,388,466 B2 * | 6/2008 | Ghabra et al. | 340/5.61 |
| 7,629,875 B2 * | 12/2009 | Baumgartner et al. | 340/426.13 |
| 7,978,049 B2 * | 7/2011 | Leitch | 340/5.72 |
| 8,138,894 B2 * | 3/2012 | Kato et al. | 340/12.28 |
| 2004/0206610 A1 | 10/2004 | Hasegawa et al. | |

FOREIGN PATENT DOCUMENTS

| | | |
|---|---|---|
| EP | 0 846 820 A1 | 6/1998 |
| JP | 2003-291778 A | 10/2003 |
| JP | 2005-256476 A | 9/2005 |
| KR | 10-0785845 B1 | 12/2007 |

* cited by examiner

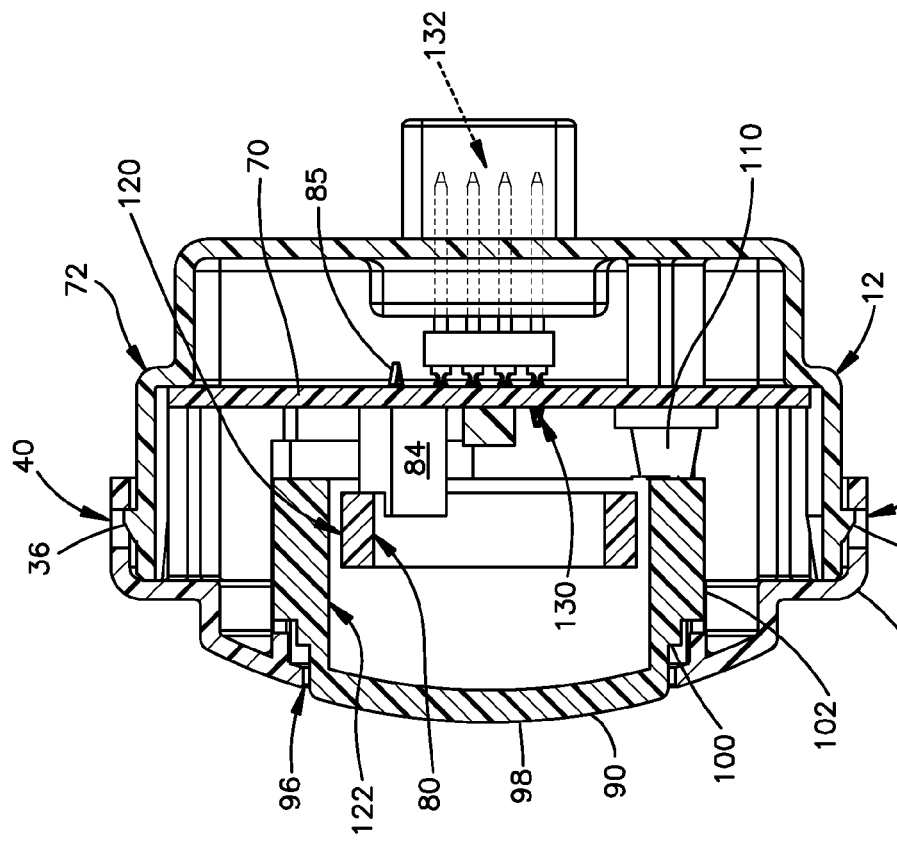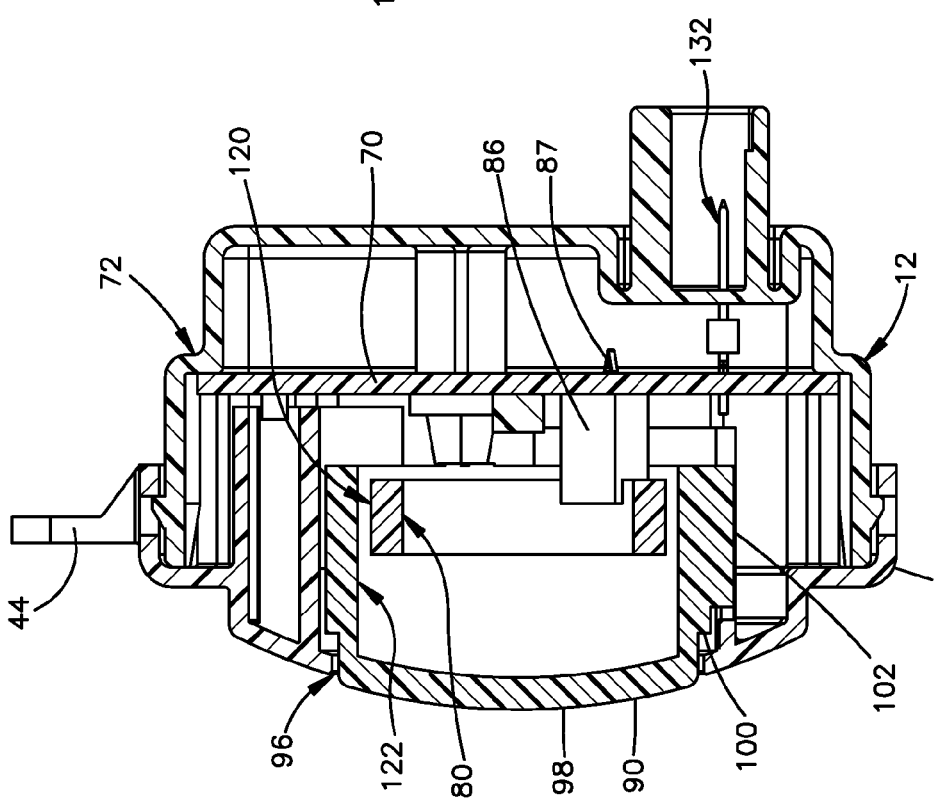

KEYLESS-GO IGNITION SWITCH WITH FAULT BACKUP

TECHNICAL FIELD

The present invention relates to a vehicle ignition system and is particularly directed to a keyless-go ignition switch assembly having a fault backup capability.

BACKGROUND

Vehicle ignition systems that use a unique, physical key to start the vehicle engine are well known in the art. Also, electrical key fobs for controlling locking and unlocking functions of the vehicle doors are known. Recently, vehicle keyless-go systems have been developed that include a fob carried by a vehicle operator. As the operator approaches the vehicle, the vehicle lock/unlocking system detects the operator.

Authentication/identification between the vehicle system and fob carried by the operator is accomplished "hands-free", i.e., without the operator touching the fob. Once inside the vehicle, if the fob carried by the operator is the correct fob associated with that vehicle, the vehicle can be started with a simple push of a start button, i.e., no form of a physical key need to be inserted into an ignition switch to get the vehicle ignition started. Thus, such systems have become known as, "keyless-go" ignition systems.

As part of the verification process between the keyless-go ignition assembly and the operator fob, the keyless-go assembly and the fob communicate via radio signals to verify identification ("ID") codes. For example, the fob may send a coded ID signal via a radio signal to the keyless-go ignition assembly. The keyless-go ignition assembly will determine if the received ID code is a valid ID from a fob associated with that vehicle. If the ID code is a valid code, as determined via a comparison against a prestored code, the ignition assembly will allow the vehicle engine to be started. If the received ID code is not valid, i.e., the received code does not match the prestored code, the ignition assembly will not allow the vehicle engine to be started.

SUMMARY OF THE INVENTION

In accordance with the present invention, a keyless-go ignition switch assembly having a fault backup capability is provided. An ignition module determines that the fob battery is dead and establishes short range LF/LF communications with the fob to both energize the fob and verify the fob so as to permit engine start.

In accordance with an example embodiment of the present invention a vehicle ignition system comprises fob including a low frequency transceiver and an ignition module including a low frequency transceiver. A control circuit associated with the ignition module is provided for activating the low frequency transceiver of the ignition module to transmit a low frequency energy signal to the fob to energize the fob. The fob low frequency transceiver, upon receiving the low frequency energy signal from the low frequency transceiver of the ignition module, transmits a low frequency response signal. The control circuit includes a verification device to verify that the fob is a fob associated with that vehicle based on the low frequency response signal.

In accordance with another example embodiment of the present invention, a vehicle ignition system includes a fob for transmitting an identification code. The fob includes a low frequency transceiver circuit and low frequency antenna. An ignition module is provided including, a housing, switch contacts and a push button slidably mounted in the housing and arranged so that pushing of said button closes said switch contacts. A LF coil is provided and is axially stationary within the housing and is located inside of the push button. An ignition module circuit provides power to the fob and establishes low frequency communications with the fob via the LF coil. An immobilizer circuit is operatively coupled to the ignition module for permitting or preventing actuation of the ignition system in response to the low frequency communications with the fob and the ignition module.

In accordance with another example embodiment of the present invention, a vehicle ignition module is provided comprising a fob having radio frequency transmitter and low frequency transceiver. The fob responds to a low frequency interrogation signal by transmitting a radio frequency response signal having a unique fob identification code and transmits a low frequency response signal when placed in proximity to low frequency signal source. An ignition module is provided including a radio frequency receiver, a low frequency transmitter, and a low frequency transceiver. The ignition module first generates a low frequency interrogation signal from the low frequency transmitter and monitors for a radio frequency response signal using the radio frequency receiver, and, if no radio frequency response signal is received by the radio frequency receiver, generates a low frequency interrogation signal from the low frequency transceiver and monitors for a low frequency response signal by the low frequency transceiver. The ignition module permits engine start if either a radio frequency response signal is received or a low frequency response signal is received.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIGS. 3B and 3C are side sectional views of the ignition module of FIG. 3A taken along sectional lines 3B-3B and 3C-3C of FIG. 3A, respectively.

DETAILED DESCRIPTION

Figure 1:
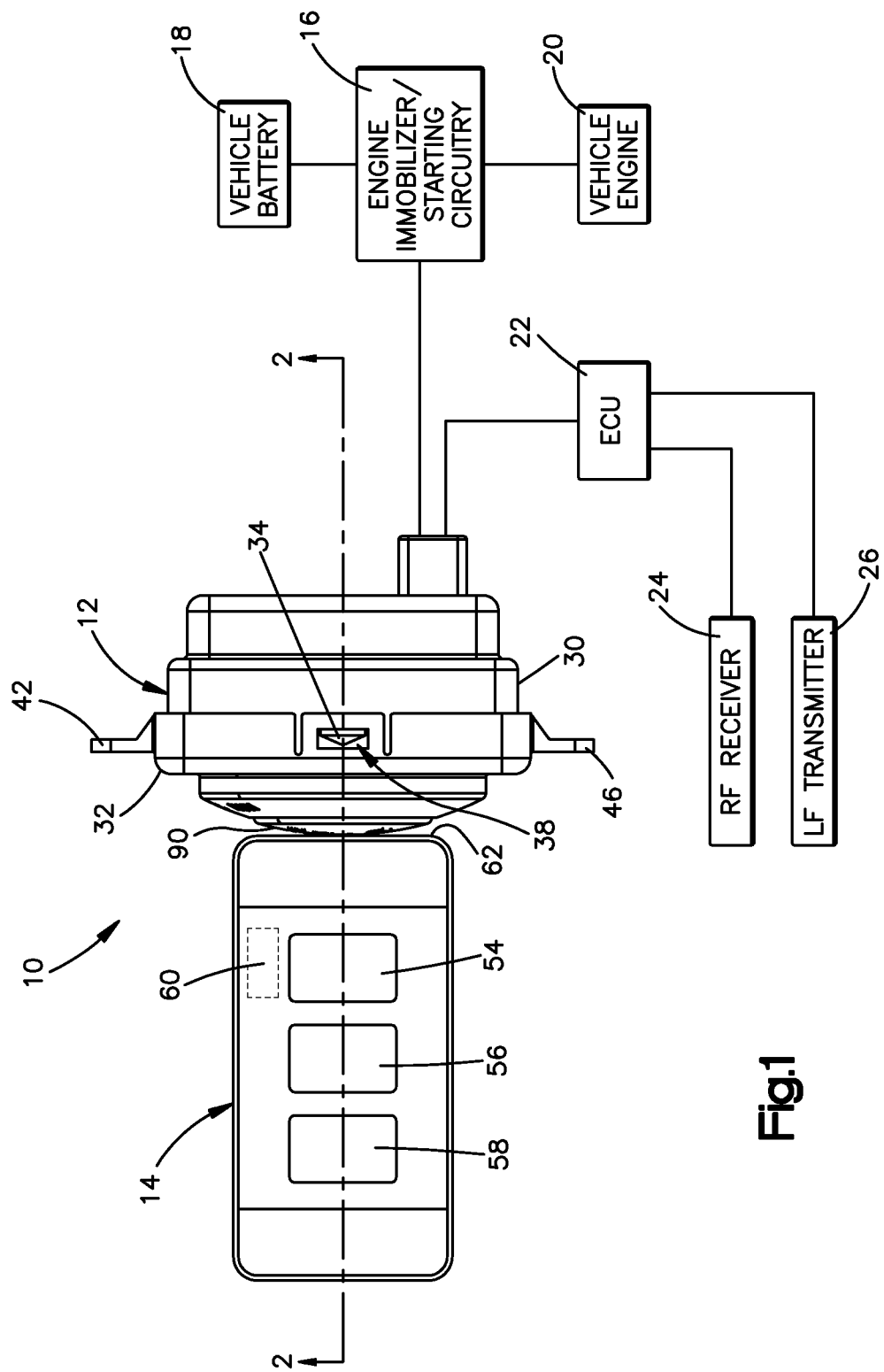
FIG. 1 is a top plan view of a keyless-go ignition assembly and fob made in accordance with one example embodiment of the present invention.
Figure 2:
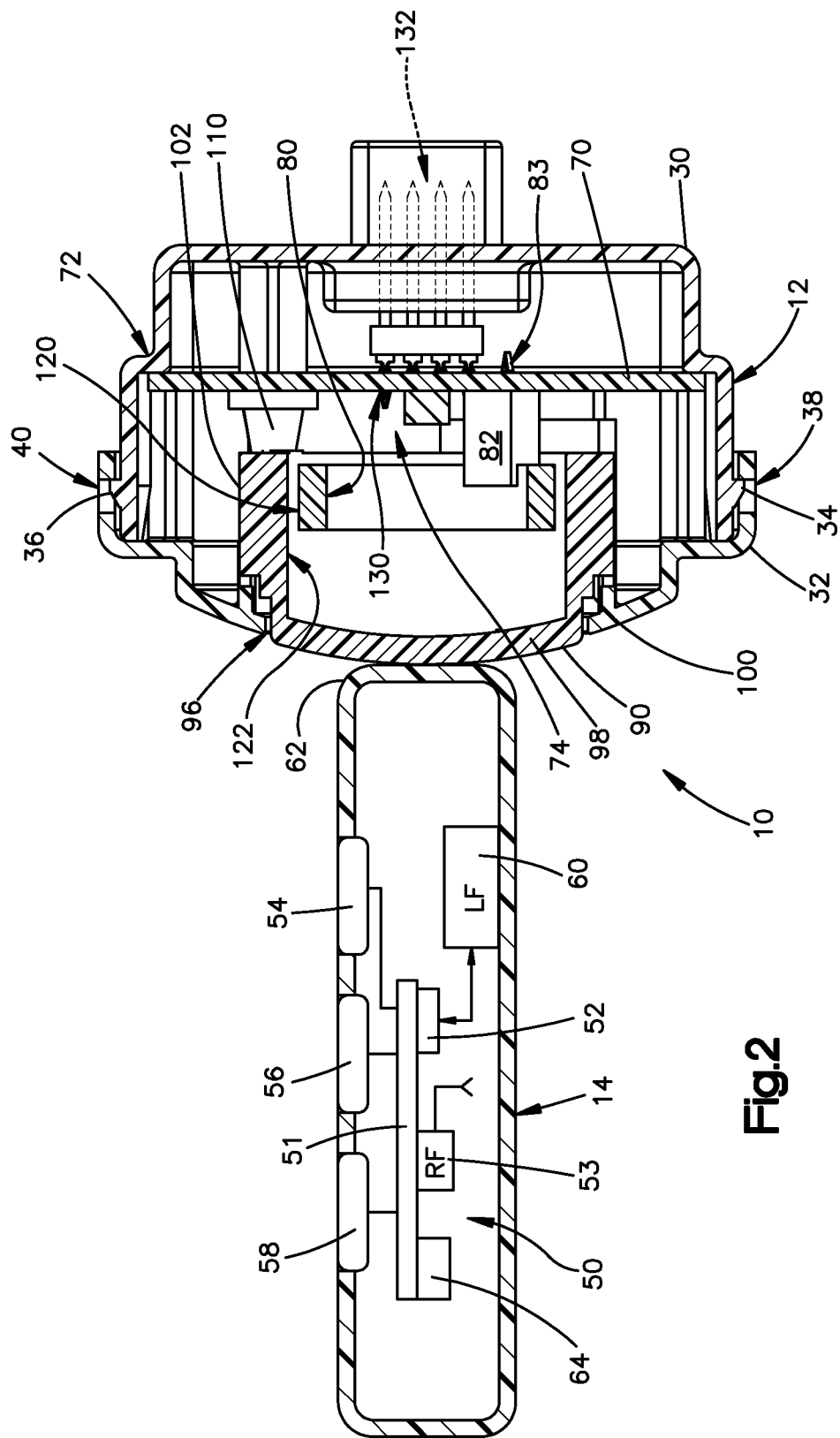
FIG. 2 is a side elevational view of the keyless-go ignition assembly and fob (with certain detail missing) in section shown in FIG. 1 taken along lines 2-2.
Figure 3A:
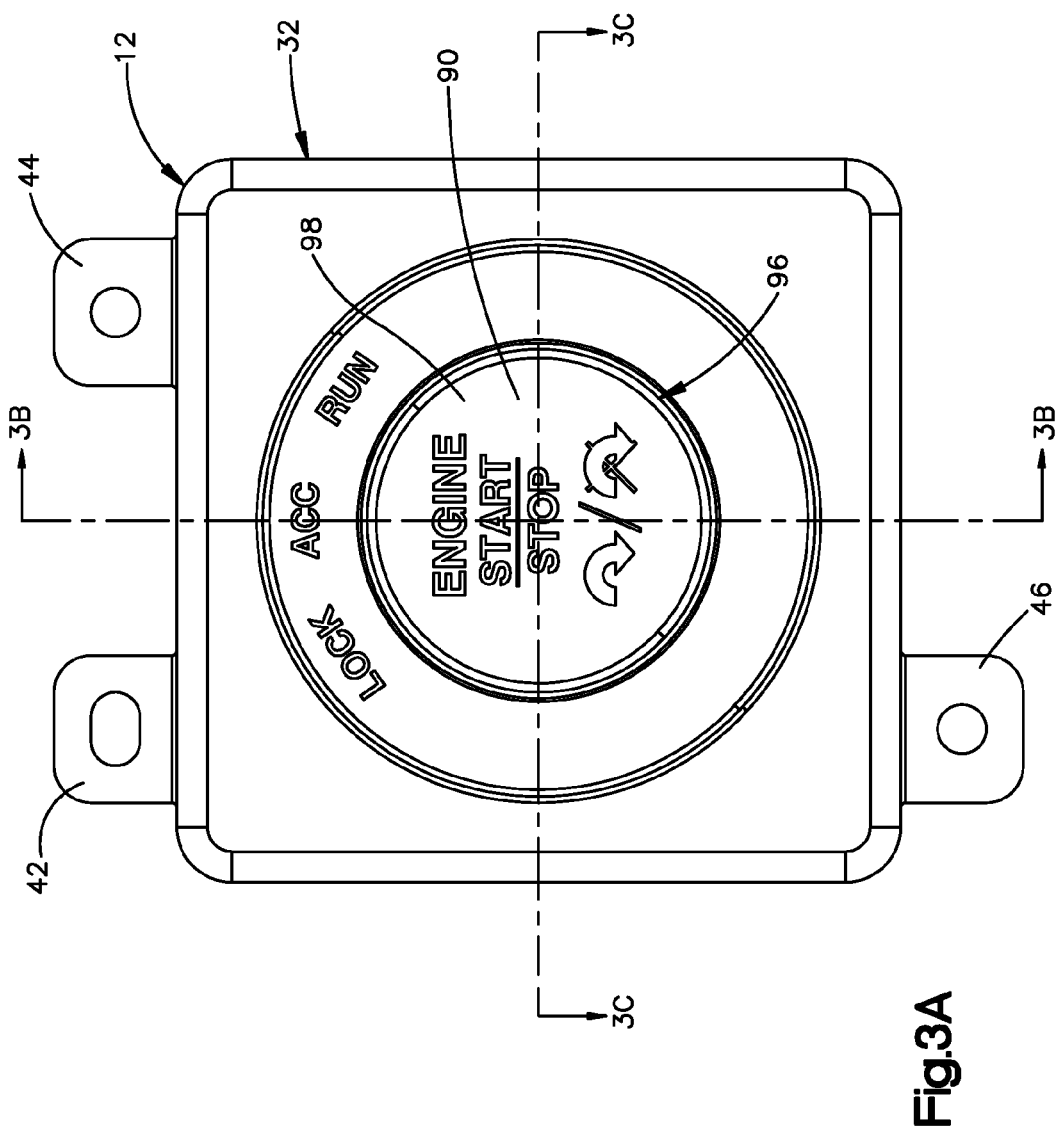
FIG. 3A is a front view of the ignition module of FIG. 1.

Referring to FIG. 1, a keyless-go assembly 10 includes an ignition module 12 and an associated vehicle owner fob 14. The ignition module 12 is operatively coupled to an engine immobilizer/starting circuitry 16 that is, in turn, operatively coupled between the vehicle battery 18 and the vehicle engine 20. When the ignition module 12 provides an engine start signal to the engine immobilizer/starting circuitry 16, the vehicle engine 20 can be started via the vehicle battery in the known manner. When the ignition module 12 provides a disable signal to the engine immobilizer/starting circuitry 16, the vehicle engine 20 cannot be started. As a default condition, the ignition module 12 provides the disable signal to the engine immobilizer/starting circuitry 16.

Also connected to the ignition module 12 is an electronic control unit ("ECU") 22, such as a microcontroller, that provides and controls wireless communications between the fob 14 and the ignition module 12 under "normal" operating circumstances, i.e., when the fob is operating under full, self-contained, battery power. The ECU 22 is controllably connected to a radio frequency ("RF") receiving circuit 24 located within the vehicle cabin for receiving RF transmitted signals from the fob 14. The RF receiving circuit could be included within the ECU 22. The ECU 22 is also controllably connected to a low frequency ("LF") transmitting circuit 26 that is located within the vehicle cabin such as in a central location of the vehicle cabin.

When activated, the LF transmitter 26 transmits an LF interrogation signal within the cabin area of the vehicle. A fob 14 located within the vehicle cabin will receive the interrogation signal and will respond by transmitting a RF response signal. The RF response signal is received by the RF receiver 24. The RF response signal transmitted by the fob 14 includes an identification code ("ID") of the fob 14. The ECU compares that received ID code against a predetermined ID code to determine if the fob 14 is the one associated with that vehicle. If it is, then vehicle starting is permitted. If not, vehicle starting would not be permitted.

The ignition module 12 includes a housing 30 and a front cover 32 arranged to snap fit onto the housing 30. The cover 32 snap fits onto the housing 30 visa-via raised tabs 34, 36 extending from opposite sides of the housing 30 that are received into and capture in openings 38, 40, respectively, of the cover 32, when the cover is placed onto the housing 30. All four sides of the housing 30 and cover 32 could have the raised tabs and corresponding receiving openings to achieve a snap fit closure if desired. The cover 32 further includes mounting tabs 42, 44, and 46, for mounting and securing the ignition module 12 into the dash board (not shown) of a vehicle. Other types of mounting arrangements could, of course, be used such as snap fitting, etc.

The fob 14 is carried by the vehicle operator. The fob 14 includes electronic circuitry 50 mounted on a printed circuit board ("PCB") 51 including a microcontroller 52 for controlling the fob's several functions. Those skilled in the art will appreciate that the control functions of the fob 14 could also be accomplished using discrete circuitry or an application specific integrated circuit ("ASIC"). The fob 14 includes several buttons 54, 56, and 58 that a vehicle operator could use could to control vehicle convenience functions controlled by the fob 14 such as door locking/unlocking, etc.

Another function controlled by the fob is passive control of the vehicle's ignition system. Passive control of the vehicle's ignition system is a semi-automatic function. When the vehicle operator is inside of the vehicle cabin and the operator pushes the ignition module to start the vehicle, the LF interrogation signal is transmitted to detect if the correct fob 14 associated with that vehicle is present. This is done by monitoring for the RF signal received from the RF receiver 24 and code verification. If there is verification, the vehicle ignition system starts the vehicle.

The fob 14 includes an LF antenna 60 located near one end 62 of the fob 14. Part of the electronic circuitry 50 of the fob 14 is arranged to receive the low frequency ("LF") interrogation signal and to determine if the LF interrogation signal is being sent from its associated vehicle. The fob 14 includes an RF transmitter 53. When the fob 14 receives an LF interrogation signal from an associated vehicle, it responds by transmitting a radio frequency ("RF") response signal. All of the electronic circuitry of the fob 14 is powered by an internal battery 64.

If the internal battery 64 of the fob 14 is completely drained, i.e., dead, then the fob 14 cannot respond to the LF transmitted signal from the LF transmitter 26 and cannot provide an RF response signal to the RF receiver 24. In that case, the ignition module 12 would remain in the default condition of retaining the starting circuit immobilized.

In accordance with an example embodiment of the present invention, the ignition module 12 further includes a printed circuit board ("PCB") 70 mounted and secured against a detent portion 72 of the housing 30. The PCB 70 has mounted thereto electronic circuitry 74 for carrying out the functions of the ignition module 12. Those skilled in the art will appreciate that the control functions of the ignition module 12 could also be accomplished using discrete circuitry or an application specific integrated circuit ("ASIC"). The ignition module 12 includes a LF antenna 80 mounted to the PCB 70 using, for example, three legs 82, 84, 86, that space the antenna away from the PCB 70. Electrical contact is made between the coil 80 and circuitry 74 via compliant pins 83, 85, 87.

The ignition module 12 further includes a start button 90 that is slidably received axially within the housing 30 and cover 32. The cover 32 includes an opening 96 that permits a first portion 98 of the start button 90 to protrude through the opening so as to be accessible to the vehicle operator when the button 90 is not being pushed inward. The button 90 includes a second portion 100 that is stepped and has a diameter larger than the diameter of the opening 96 in the cover 32 so as to retain the button 90 within the housing 12 at all times. A third portion 102 of the button 90 slidably engages surfaces within the housing 30 and cover 36 so as to axially slide when pushed. An elastomeric switch member 110 is mounted between the PCB 70 and the push button 90 to resiliently bias the button 90 toward and against the cover 32. The elastomeric switch member 110, in addition to providing a bias force to the push button 90 includes switch contacts that are open when the button 90 is not pushed and closed when the button 90 is pushed inward. Therefore, the circuitry 74 can determine when the push button is activated by the vehicle operator by monitoring the elastomeric switch member 110.

The outer diameter 120 of the LF coil 80 is less than the inner diameter 122 of the push button 90. The axially length of the legs 82, 84, 86 are such that the coil 80 is always located axially inside of the axially length of the push button 90 whether the push button is pressed or not.

A plurality of compliant pins 130 of a connector 132 provide a connection from the circuitry 74 on the PCB 70 to external circuitry such as the ECU 22 and the engine immobilizer/starting circuitry 16.

As mentioned, if the internal battery 64 of the fob 14 is completely drained, i.e., dead, then the fob 14 cannot respond to the LF transmitted signal from the LF transmitter 26 and cannot provide an RF response signal to the RF receiver 24. In accordance with an example embodiment of the present invention, the fob 14 is placed directly in contact with the ignition module 12 such that the side 62 contacts the push button 90. This places the LF antenna 60 inside the fob 14 closest to the ignition module. The vehicle operator then pushes the ignition module button 90 all the way in as if to start the vehicle with fob 14.

The ignition module, at first, does not "know" that is being pushed by the fob 14 as opposed to being pushed by a vehicle operator's finger. The ignition module attempts to locate a fob by transmitting a LF interrogation signal using the LF transmitter 26 and monitoring for a response signal via the RF receiver. However, when no RF response signal is received, the ignition switch 12 then goes to fault check process.

In accordance with the present invention, the fault check process, the LF coil 80 is energized with an interrogation signal. This is a low power signal that only travels a relatively short distance that would not normally be received by a fob carried by a vehicle operator. However, the LF signal provided by the coil 80 is received by the fob 14 that is pushing in on the button 90. The transmitted LF signal from the coil 80 is used by the fob to energize the fob such that the fob can transmit back to the ignition module LF response signal. The ignition module monitors for the LF response signal back from the fob. If the LF response signal includes appropriate ID information, the vehicle will be started since the switch 110 is already pressed closed.

As should be appreciated, in this fault mode, the ignition module has switched from a LF/RF communications mode to a LF/LF communications mode and the LF from the ignition module is used to provide operating power to the fob which would otherwise be dead.

From the above description of the invention, those skilled in the art will perceive improvements, changes and modifications. Such improvements, changes and modifications within the skill of the art are intended to be covered by the appended claims.

Having described the invention, the following is claimed:

1. A vehicle ignition system comprising:
   a fob including a battery for energizing said fob, a low frequency transceiver having an associated low frequency antenna, and a radio frequency transmitter having an associated radio frequency antenna;
   an ignition module including a switch, a low frequency transmitter for, when energized, providing a first low frequency signal in a cabin of the vehicle, a low frequency transceiver having an associate low frequency antenna located adjacent the switch for, when energized, proving a second low frequency signal, said second low frequency signal being localized near the switch, and a radio frequency receiver; and
   a control circuit associated with said ignition module for activating said low frequency transmitter of said ignition module when said switch is activated to provide said first low frequency signal in the cabin of the vehicle and monitoring for a radio frequency response signal from said fob using said radio frequency receiver, said control circuit, upon an absence of monitoring the radio frequency response signal from said fob, activating said low frequency transceiver of said ignition module to provide said second low frequency signal from the associated antenna located adjacent the switch and, after providing said second low frequency signal, monitoring for a low frequency response signal from said fob, said second low frequency signal from said low frequency transceiver providing operating energy for said fob when said fob is located sufficiently near said switch,
   said fob providing the radio frequency response signal in response to receiving the first low frequency signal from the ignition module when the battery of said fob is energizing said fob and providing the low frequency response signal in response to receiving and being energized by the second low frequency signal from said low frequency transceiver of said ignition module when the battery fails to energize said fob,
   said control circuit further including a verification device to verify that said fob is a fob associated with that vehicle based on at least one of the radio frequency response signal and the low frequency response signal from the fob.

2. The vehicle ignition system of claim 1 wherein said ignition module further includes:
   (a) a housing;
   (b) switch contacts associated with said switch;
   (c) a push button slidably mounted in said housing and arranged so that pushing of said button closes said switch contacts; and
   (d) the associated low frequency antenna of the ignition module being axially stationary within said housing and located completely inside of said push button; and
   wherein the vehicle ignition system further includes an immobilizer circuit operatively coupled to the ignition module for permitting or preventing actuation of said ignition system in response to the verification device of said ignition module.

3. A vehicle ignition module comprising:
   a fob having radio frequency transmitter having an associated radio frequency antenna and low frequency transceiver having an associated low frequency antenna, said fob responding to a first low frequency signal by transmitting a radio frequency response signal having a unique fob identification code and transmitting a low frequency response signal having a unique fob identification code when said fob receives a second low frequency signal, said second low frequency signal energizing said fob;
   an ignition module including a switch, a radio frequency receiver, a low frequency transmitter, and a low frequency transceiver, said ignition module,
   (a) generating said first low frequency signal from the low frequency transmitter into a cabin of the vehicle and monitoring for the radio frequency response signal using the radio frequency receiver, and
   (b) if no radio frequency response signal is received by the radio frequency receiver, generating said second low frequency signal from said low frequency transceiver of said ignition module in an area around the switch and monitoring for the low frequency response signal from the low frequency transceiver of said fob, said second low frequency signal energizing said fob when said fob is near said switch when said second low frequency signal is provided by said ignition module,
   said ignition module permitting engine start if either the radio frequency response signal is received or the low frequency response signal is received from said fob with an appropriate code.

4. The vehicle ignition module of claim 3 wherein said ignition module includes a circuit to compare any received identification code against a predetermined code to determine if the code received is appropriate indicating that i the fob is a fob associated with that vehicle.

* * * * *